(12) United States Patent
Medjaouri et al.

(10) Patent No.: US 12,038,768 B2
(45) Date of Patent: Jul. 16, 2024

(54) OBSTACLE DETECTION AND AVOIDANCE SYSTEM FOR AUTONOMOUS AIRCRAFT AND OTHER AUTONOMOUS VEHICLES

(71) Applicant: Southwest Research Institute, San Antonio, TX (US)

(72) Inventors: Omar D. Medjaouri, San Antonio, TX (US); David J. Anthony, San Antonio, TX (US); Stephen A. Geiger, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 229 days.

(21) Appl. No.: 17/472,880

(22) Filed: Sep. 13, 2021

(65) Prior Publication Data

US 2023/0082486 A1    Mar. 16, 2023

(51) Int. Cl.
| | |
|---|---|
| G05D 1/00 | (2024.01) |
| B64C 39/02 | (2023.01) |
| B64U 10/25 | (2023.01) |
| G01S 15/86 | (2020.01) |
| G01S 15/931 | (2020.01) |
| G01S 17/931 | (2020.01) |
| G01S 17/933 | (2020.01) |
| G06T 7/593 | (2017.01) |
| G06V 20/17 | (2022.01) |

(Continued)

(52) U.S. Cl.
CPC ............ *G05D 1/106* (2019.05); *G01S 15/86* (2020.01); *G01S 15/931* (2013.01); *G01S 17/931* (2020.01); *G01S 17/933* (2013.01); *G05D 1/0088* (2013.01); *G06T 7/593* (2017.01); *G06V 20/17* (2022.01); *G06V 20/58* (2022.01); *G08G 5/04* (2013.01); *B64C 39/024* (2013.01); *B64U 10/25* (2023.01); *G06T 2207/10012* (2013.01); *G06T 2207/10032* (2013.01); *G06T 2207/30261* (2013.01)

(58) Field of Classification Search
CPC ...... G05D 1/106; G05D 1/0088; G01S 15/86; G01S 15/931; G01S 17/931; G01S 17/933; G06T 7/593; G06V 20/17; G06V 20/58; G08G 5/04; G08G 5/0052; G08G 5/0069; G08G 5/045; G08G 5/0021
See application file for complete search history.

(56) References Cited

U.S. PATENT DOCUMENTS

2017/0193830 A1\* 7/2017 Fragoso ................. G08G 5/045
2018/0012370 A1\* 1/2018 Aghamohammadi ....................... G06F 18/251

(Continued)

FOREIGN PATENT DOCUMENTS

WO    WO-2019138834 A1 \* 7/2019 ............. G01B 11/10

*Primary Examiner* — Ig T An
(74) *Attorney, Agent, or Firm* — Livingston Law Firm

(57) ABSTRACT

A method of providing a collision avoiding travel path for an autonomous vehicle. A sensor system obtains stereo image data of a scene in the environment ahead of the normal travel path. This image data is used to generate a disparity image. The disparity image is processed to generate an occupancy map that assigns values to areas of the scene based on levels of visual clutter. The occupancy map is then converted to a potential field, which assigns each pixel in the scene with a force value that corresponds to its proximity to one or more obstacles. These force value are summed and used to modify the vehicle's path is a collision is likely.

15 Claims, 2 Drawing Sheets

(51) Int. Cl.
    *G06V 20/58*     (2022.01)
    *G08G 5/04*     (2006.01)

(56) References Cited

U.S. PATENT DOCUMENTS

| 2018/0190016 A1* | 7/2018 | Yang | G01C 11/30 |
| 2018/0322646 A1* | 11/2018 | Matthies | G06V 20/10 |
| 2021/0089040 A1* | 3/2021 | Ebrahimi Afrouzi | A47L 9/2873 |

* cited by examiner

OBSTACLE DETECTION AND AVOIDANCE SYSTEM FOR AUTONOMOUS AIRCRAFT AND OTHER AUTONOMOUS VEHICLES

TECHNICAL FIELD OF THE INVENTION

This patent application relates to autonomous vehicles, and more particularly to collision avoidance systems for such vehicles.

BACKGROUND OF THE INVENTION

Perception algorithms are used to navigate autonomous vehicles. Many autonomous vehicles, such as automobiles, are mainly designed to operate on structured roads or lanes and their perception algorithms are primarily used for tasks such as object tracking and lane detection. Other autonomous vehicles, such as some autonomous ground vehicles (UGVs) or aircraft (UAVs) must operate in less structured environments.

For UAV's, flight involves perception, planning, and control. In flight, the UAV must "detect and avoid", which is the ability of the UAV to detect other aircraft or obstacles. For example, the UASV may need to navigate around ground infrastructure and in airspace with other aircraft, birds, and more.

One challenge in UAV travel is that the perception must have a sufficiently long field of view to accommodate the speed of the UAV. Also, in the air, obstacle avoidance is a three-dimensional proposition, and can become complex when the UAV might encounter several obstacles at once.

Another challenge is that conventional perception algorithms do not work well in environments that have become degraded, such as through weather or radiation exposure or other physical events. Thin wires and debris are difficult to detect even in well-lit locations and even more so when lighting is poor such as in disaster areas.

Conventional perception algorithms rely on mapping the environment and maintaining a state of the world. However, these algorithms can suffer from accumulated error and have high performance costs. Attempts have been made to reduce performance requirements by increasing the minimum grid scale of the map but this results in failure to handle small objects common in degraded environments.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to an obstacle detection and obstacle avoidance system (ODOA) for UAVs and other autonomous vehicles. The ODOA system uses image sensing to view the scene in the vehicle's direction of travel, and to generate a "potential field correction value", which is then is used to direct the UAV through its environment.

The ODOA system is particularly suited for vehicles that travel on unstructured paths and in unpredictable and degraded environments. It is also particularly suited for autonomous vehicles that have hardware constraints due to a desire to have the vehicle carry a light payload.

For purposes of this description, the ODOA system is described for use with a UAV. However, the same system may also be used for other types of autonomous vehicles, whether they travel in air, on ground, or in water.

Figure 1:
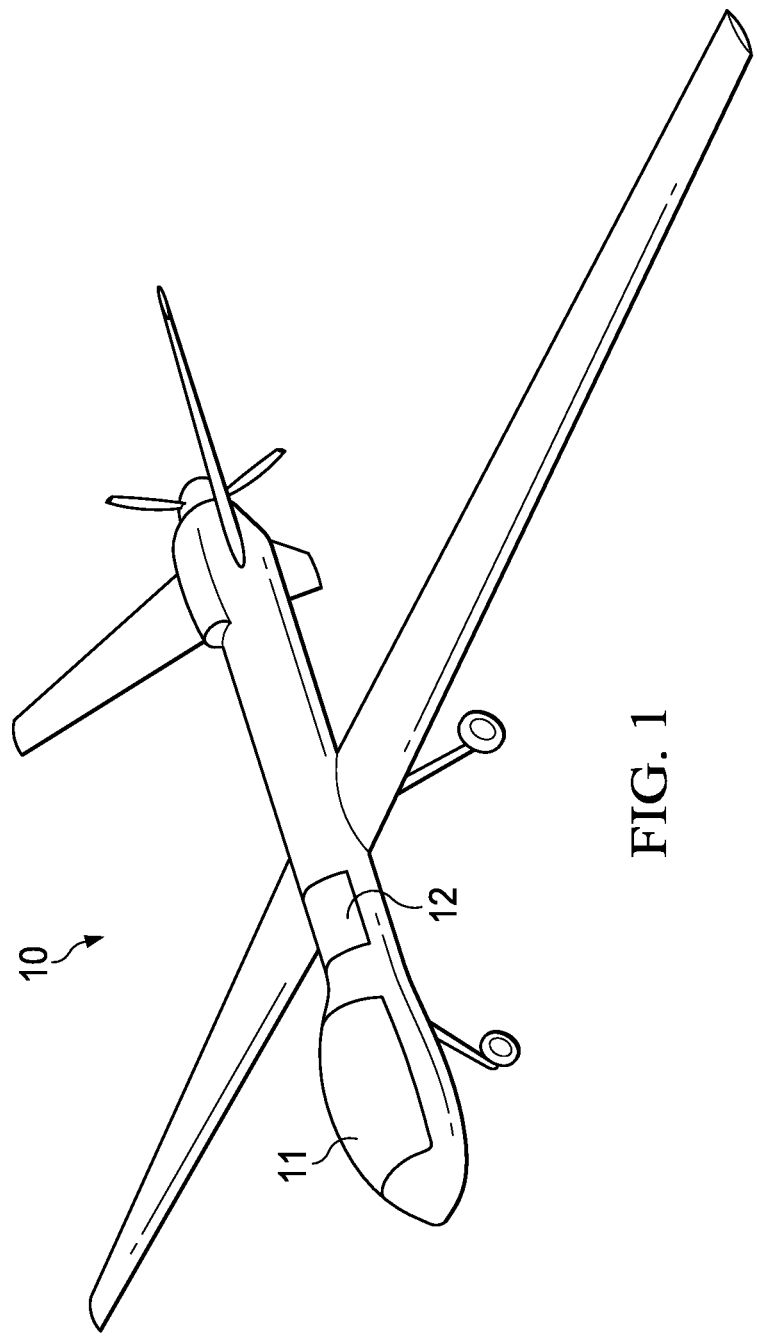
FIG. 1 illustrates an autonomous vehicle having an object detection and object avoidance (ODOA) system in accordance with the invention.

FIG. 1 illustrates an example of an autonomous vehicle, here a UAV 10, equipped with an on-board ODOA system 11 in accordance with the invention. As explained below, the ODOA system 11 needs no external communication and communicates directly with the UAV's navigation system 12 to avoid collisions.

Navigation system 12, among other tasks, determines a waypoint goal, where a "waypoint" is a geographical location used to define a "normal" travel path that the UAV 10 is to follow. As used herein, the "normal" travel path is the travel path dictated by the navigation system 12 in the absence of obstacles detected by the ODOA system 11.

Navigation system 12 is typically implemented with sophisticated software that processes waypoint and other input, plots a travel path, and sends instructions to the car's actuators, which control acceleration, braking, and steering.

As explained below, the ODOA system 11 may cause the travel path to be modified, depending on whether the ODOA system 11 generates a correction value that exceeds a predetermined threshold. If this occurs, the travel path is then modified so that a likely collision is avoided.

UAV 10 is further assumed to have propulsion and control systems suitable for the type of UAV.

Figure 2:
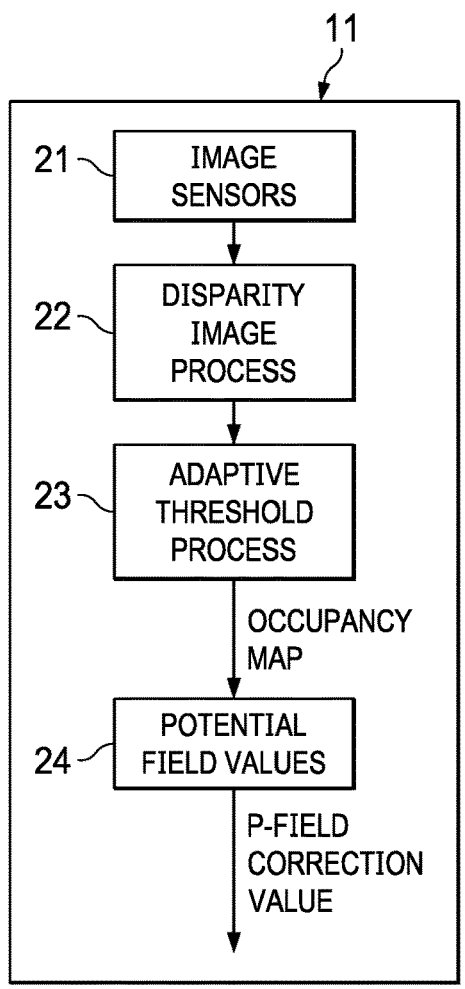
FIG. 2 illustrates how the ODOA system senses the environment of the vehicle's travel path and produces a correction value used adjust the vehicle's normal travel path.

FIG. 2 illustrates ODOA system 11 in further detail. A sensor system 21 detects the environment of the UAV 10 and generates a continuous series of scenes as the UAV travels. Various sensors may be used, such as cameras or other electro-optical imaging systems, other "vision" sensors, ultrasonic, and/or lidar sensors.

Depending on the sophistication of the system 11 and the type of UAV and its flight direction alternatives, the sensor system 21 may detect be "forward looking" relative to the UAV's travel path and detect only forward obstacles. Or the sensor system may see multidirectionally to detect obstacles behind, beside, above, and/or below the UAV. For purposes of this description, the direction(s) in which the sensor system "sees" are referred to as the "environment" or "scene" of the UAV.

In general, any sensing system may be used that will produce images that may be processed to generate disparity images of the surroundings. Thus, the sensors are configured to produce stereo images of scenes toward which the UAV's travel path is directed.

"Disparity" refers to the distance between two corresponding points in the left and right image of a stereo pair. Generating a disparity image involves a matching process for every pixel in a left-hand image, finding its match in a right-hand image and computing the distance between them. In the disparity image, every pixel contains the distance/disparity value for that pixel in the left image.

In other words, by comparing the two stereo images, relative depth information can be obtained in the form of a disparity map, which encodes the difference in horizontal coordinates of corresponding image points. The values in this disparity map are inversely proportional to the scene depth at the corresponding pixel location.

Disparity image process 22 generates disparity images from the output of sensor system 21. Disparity image process 22, like the other processes described herein, may be implemented with digital processors and other processing devices programmed to perform the tasks described. Various techniques are known for generating disparity maps for extracting information about the relative position of three-dimensional objects in the vicinity of an autonomous system. Depth information allows for the system to separate occluding image components, such as one object in front of another.

ODOA system 11 then delivers the disparity images to an adaptive threshold process 23. This process deliberates on areas of the disparity images with higher levels of visual clutter. It produces an occupancy map, which represents the scene viewed by the UAV 10 as a field of variables each representing the presence of an obstacle at that location in the environment. The occupancy map assigns a clutter value to each area based on the level of visual clutter in the scene. An area of visual clutter with a sufficiently high clutter value is assumed to represent an object to be avoided by the UAV.

Potential field process 24 processes the occupancy map to convert it into a potential field. In the potential field, each pixel in an image is assigned a force value that corresponds to that pixel's proximity to an obstacle. The closer a pixel is to an object, the higher the force value. A pixel's proximity to more than one object will also result in a higher force value.

Essentially, the method uses the occupancy map to determine which areas in the scene need to be avoided. It does this by generating forces pointing away from objects that increase in magnitude as the UAV gets closer to the objects. Additionally, if multiple objects are in close proximity, the magnitude of the forces are summed to have greater influence on the deviation from the UAV's original path.

The values of each pixel in the potential field are summed, with additional weighting provided for pixels in the middle third of the potential field. The result is a P-field (potential field) correction value. If the P-field correction value exceeds a predetermined threshold, the surroundings ahead in the UAV's current direction of travel are deemed to have one or more obstacles, presenting an unsafe travel path.

Figure 3:
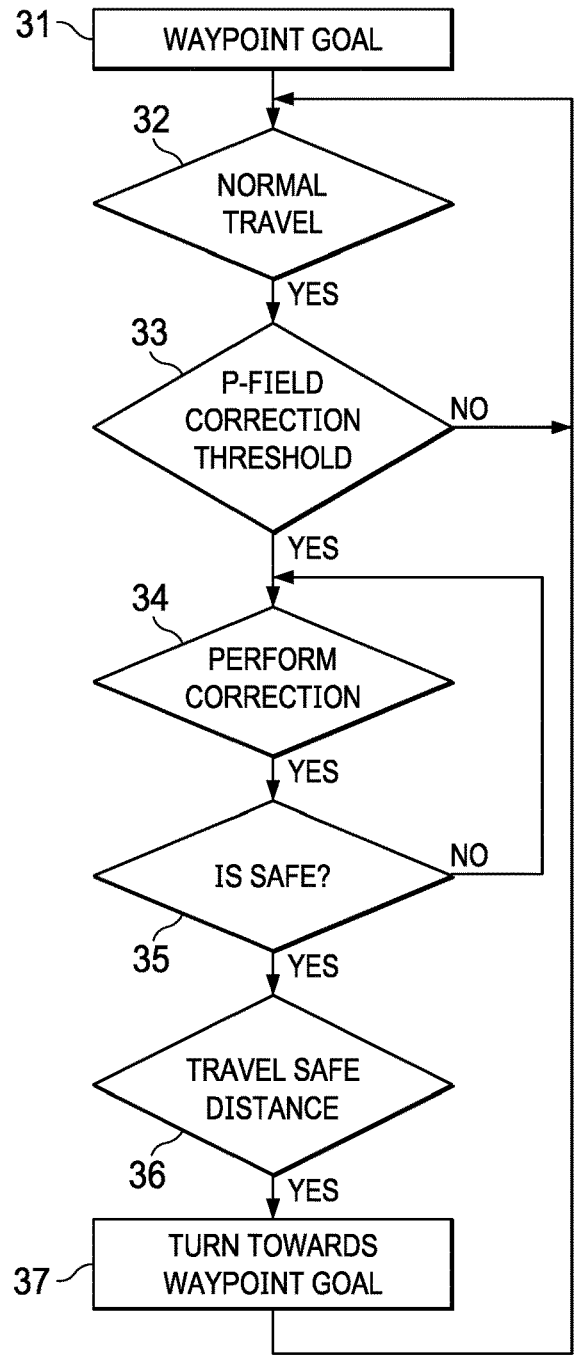
FIG. 3 illustrates how the correction value is used to adjust the vehicle's normal travel path.

FIG. 3 illustrates a method of using the P-field correction value generated by ODOA system 11 to determine whether the UAV's travel path is to be modified for collision avoidance. As explained below, during flight of the UAV, the method is used to continually use the sensor system 21, to generate P-field correction values, and to adjust the travel path if needed.

The method of FIG. 3 may be implemented as a path correction processor performing the tasks described. Like the processes of FIG. 2, the processor of FIG. 3 is carried on-board the aircraft as path of the ODOA system 11.

Step 31 is generating a waypoint goal for the UAV. This waypoint goal determines the general direction in which the UAV is to travel to arrival at the goal (destination).

Step 32 is determining a normal travel path for the UAV, typically one that would be determined by the UAV's navigation system 12 in the absence of obstacles.

Step 33 is comparing the P-field correction value, determined as described above by the ODOA system 11, to a predetermined threshold value. This ensures that the UAV's flight is only corrected for obstacles that are deemed significant to its safe travel.

If the P-field correction valve does not exceed the threshold, the UAV continues along its normal travel path.

If the P-field correction valve exceeds the threshold, this information is provided to the navigation system 12, and in Step 32, the travel path is corrected to avoid the scene detected by the sensor system 21.

In Step 35, the ODOA system 11 continues to provide P-field correction values, which are compared to the threshold, until the travel path is without obstacles.

In Step 36, the navigation system 12 directs the UAV to travel a "safe" distance from the obstacle, and in Step 37, to turn again toward its waypoint goal and resume its normal travel path.

What is claimed is:

1. A method of providing a collision avoiding travel path for an autonomous vehicle, the vehicle having a navigation system that determines a normal travel path for the autonomous vehicle, comprising:
    using a sensor system to obtain stereo image data of a scene in the environment ahead of the normal travel path;
    generating a disparity image from the stereo view data;
    processing the disparity image to generate an occupancy map that assigns values to areas of the scene based on levels of visual clutter, thereby identifying one or more obstacles in the scene;
    converting the occupancy map to a potential field, which assigns each pixel in the scene with a force value that corresponds to that pixel's proximity to one or more obstacles, such that the closer the pixel is to an object the higher is its force value;
    increasing force values for each pixel, based on whether a corresponding pixel has proximity to more than one obstacle;
    summing the force values within the scene, thereby generating a potential field correction value;
    comparing the potential field correction value to a predetermined threshold value;
    if the potential field correction value does not exceed the threshold value, proceeding on the normal travel path;
    if the potential field correction value is above the threshold value, delivering this information to the navigation system for correction of the normal travel path; and
    repeating the above steps during travel of the autonomous vehicle.

2. The method of claim 1, wherein the summing step is preceded by weighting pixel values in a mid-portion of the scene.

3. The method of claim 1, wherein the sensor system comprises electro-optical imagers.

4. The method of claim 1, wherein the sensor system comprises ultrasonic and/or lidar sensors.

5. The method of claim 1, wherein the sensor system is forward looking relative to the travel path.

6. The method of claim 1, wherein the sensor system is multi-directional looking.

7. The method of claim 1, wherein the vehicle is an autonomous aircraft and the system is carried on-board the aircraft.

8. The method of claim 1, wherein the vehicle is a ground vehicle and the system is carried on-board the ground vehicle.

9. A collision avoidance system for an autonomous vehicle, the vehicle having a navigation system that determines a normal travel path for the autonomous vehicle, comprising:

a sensor system operable to obtain stereo image data of a scene in the environment ahead of the normal travel path;

a disparity image processor for generating a disparity image from the stereo view data;

an adaptive threshold process for processing the disparity image to generate an occupancy map that assigns values to areas of the scene based on levels of visual clutter, thereby identifying one or more obstacles in the scene;

a potential field value process for converting the occupancy map to a potential field, which assigns each pixel in the scene with a force value that corresponds to that pixel's proximity to one or more obstacles, such that the closer the pixel is to an object the higher the force value, for increasing force values based on whether a corresponding pixel has proximity to more than one obstacle, and for summing the force values within the scene, thereby generating a potential field correction value; for comparing the potential field correction value to a predetermined threshold value; and if the potential field correction value is above the threshold value, delivering this information to the navigation system for correction of the normal travel path.

10. The system of claim 9, wherein the sensor system comprises electro-optical imagers.

11. The system of claim 9, wherein the sensor system comprises ultrasonic and/or lidar sensors.

12. The system of claim 9, wherein the sensor system is forward looking relative to the travel path.

13. The system of claim 9, wherein the sensor system is multi-directional looking.

14. The system of claim 9, wherein the vehicle is an autonomous aircraft and the system is carried on-board the aircraft.

15. The system of claim 9, wherein the vehicle is a ground vehicle and the system is carried on-board the ground vehicle.

* * * * *